United States Patent
Durif et al.

[11] Patent Number: 5,617,078
[45] Date of Patent: Apr. 1, 1997

[54] ELECTRONIC TRIP DEVICE COMPRISING A STORAGE DEVICE

[75] Inventors: Ghislain Durif, Meylan, France; Allistair Morfey, Cambridgeshire, Great Britain

[73] Assignee: Schneider Electric SA, France

[21] Appl. No.: 416,345

[22] Filed: Apr. 4, 1995

[30] Foreign Application Priority Data

Apr. 21, 1994 [FR] France .................................. 94 04923

[51] Int. Cl.⁶ .................................................. G08B 21/00
[52] U.S. Cl. ............................................ 340/652; 340/649
[58] Field of Search .................................. 340/649, 650, 340/652

[56] References Cited

U.S. PATENT DOCUMENTS

| | | | |
|---|---|---|---|
| 4,979,070 | 12/1990 | Bodkin | 340/650 |
| 5,014,043 | 5/1991 | Lopetrone et al. | 340/650 |
| 5,136,456 | 8/1992 | Yeh | 340/650 |
| 5,168,414 | 12/1992 | Horstmann | 340/652 |

FOREIGN PATENT DOCUMENTS

| | | |
|---|---|---|
| 0075296 | 3/1983 | European Pat. Off. . |
| 2212668 | 7/1974 | France . |
| 3606287 | 9/1987 | Germany . |

*Primary Examiner*—Jeffery Hofsass
*Assistant Examiner*—Timothy Edwards, Jr.
*Attorney, Agent, or Firm*—Parkhurst, Wendel & Burr, L.L.P.

[57] ABSTRACT

An electronic trip device having a processing unit producing a tripping signal when currents of a power system to be protected exceed preset thresholds for preset times, and a trip storage device connected to the processing unit, the storage device having a storage circuit comprising two terminals, a diode connected in series with a capacitor between the terminals and a resistor connected in parallel with the capacitor, the storage device being able to inject a strong current to charge the capacitor via the diode before tripping and able to inject a weak current when the trip device is put into operation, and to measure the voltage at the terminals of the storage circuit.

5 Claims, 7 Drawing Sheets

ELECTRONIC TRIP DEVICE COMPRISING A STORAGE DEVICE

BACKGROUND OF THE INVENTION

The invention relates to an electronic trip device comprising a processing unit producing a tripping signal when currents of a power system to be protected exceed preset thresholds for preset times, and a trip storage device connected to the processing unit.

In state-of-the-art electronic trip devices, the tripping functions supply a circuit breaker opening order when at least one current flowing through a pole of the circuit breaker exceeds a preset current threshold for a time greater than that corresponding to the tripping curve. Among these functions, we can name the long delay function, or thermal function, and the short delay function, or magnetic function.

The long delay function has a threshold which corresponds to the circuit breaker setting current and a tripping time delay generally reversely proportional to the square of the fault current. In normal operation, with the circuit breaker closed, the long delay function simulates heating and cooling of a power system to be protected by making a quantity representative of the thermal state vary. After opening of the circuit breaker, the long delay function no longer operates, in the case of a system-powered trip device, and the thermal behaviour simulation is no longer performed.

Closing of the circuit breaker initializes the quantity representative of the thermal state at a minimum value and does not take account of the heat rise before opening of the circuit breaker and of the cooling during opening. This situation may be damaging for the power system if the opening was caused by a long delay fault trip and the circuit breaker reclosed on an overload, without a cooling delay.

To overcome these drawbacks, some state-of-the-art electronic trip devices comprise devices for storing the fault type indicating the thermal state before tripping, and devices for measuring the time elapsed between tripping and reclosing of the circuit breaker.

State-of-the-art storage and time measuring devices generally comprise a power supply circuit ensuring their operation during the open state of the circuit breaker. In state-of-the-art manner, the power supply circuits comprise capacitors, accumulator cells or batteries to conserve the electrical operating energy.

The electronic components to achieve these devices are costly and bulky, and become incompatible with highly integrated electronic trip devices able to be fitted in circuit breakers of small dimensions. Moreover, the reliability of the components, notably of the power supply circuits, deteriorates rapidly with time and with the ambient temperature of the circuit breakers.

SUMMARY OF THE INVENTION

The object of the invention is to achieve an economical and reliable storage device of the thermal state of a power system to be protected, for electronic trip devices.

According to the invention, this object is achieved by the fact that the storage device comprises a storage circuit comprising two terminals, a diode connected in series with a capacitor between said terminals and a resistor connected in parallel with said capacitor, the storage device comprising means for injecting a strong current to charge the capacitor via the diode before tripping, means for injecting a weak current when the trip device is put into operation and means for measuring the voltage at the terminals of the storage circuit.

According to an embodiment of the invention, the storage circuit is coated in an insulating material.

According to a preferred embodiment, the storage device comprises comparison means between a preset voltage threshold and the voltage at the terminals of the storage circuit.

To reduce the electrical consumption of the device, the preset voltage threshold is generated at the same time as input of the weak current.

The processing unit comprises means for initializing a quantity, representative of the thermal state of the power system to be protected, at a minimum value if, when the trip device is put into operation, the voltage at the terminals of the storage circuit is lower than the preset threshold, and at an intermediate value, greater than the minimum value, if the voltage at the terminals of the storage circuit is greater than the preset threshold. The storage device comprises means for compensating the voltage drop in the storage circuit diode.

In a particular embodiment, the capacitor is of the plastic film type.

According to a first development of the invention, the device comprises a plurality of comparison means having different preset thresholds, the quantity representative of the thermal state being initialized at different values according to the results of the comparisons.

According to a second development of the invention, the device comprises an analog-to-digital converter to measure the voltage at the terminals of the storage circuit.

BRIEF DESCRIPTION OF THE DRAWINGS

Other advantages and features will become more clearly apparent from the following description of illustrative embodiments of the invention, given as non-restrictive examples only and represented in the accompanying drawings in which.

DETAILED DESCRIPTION OF THE PREFERRED EMBODIMENT

Figure 1:
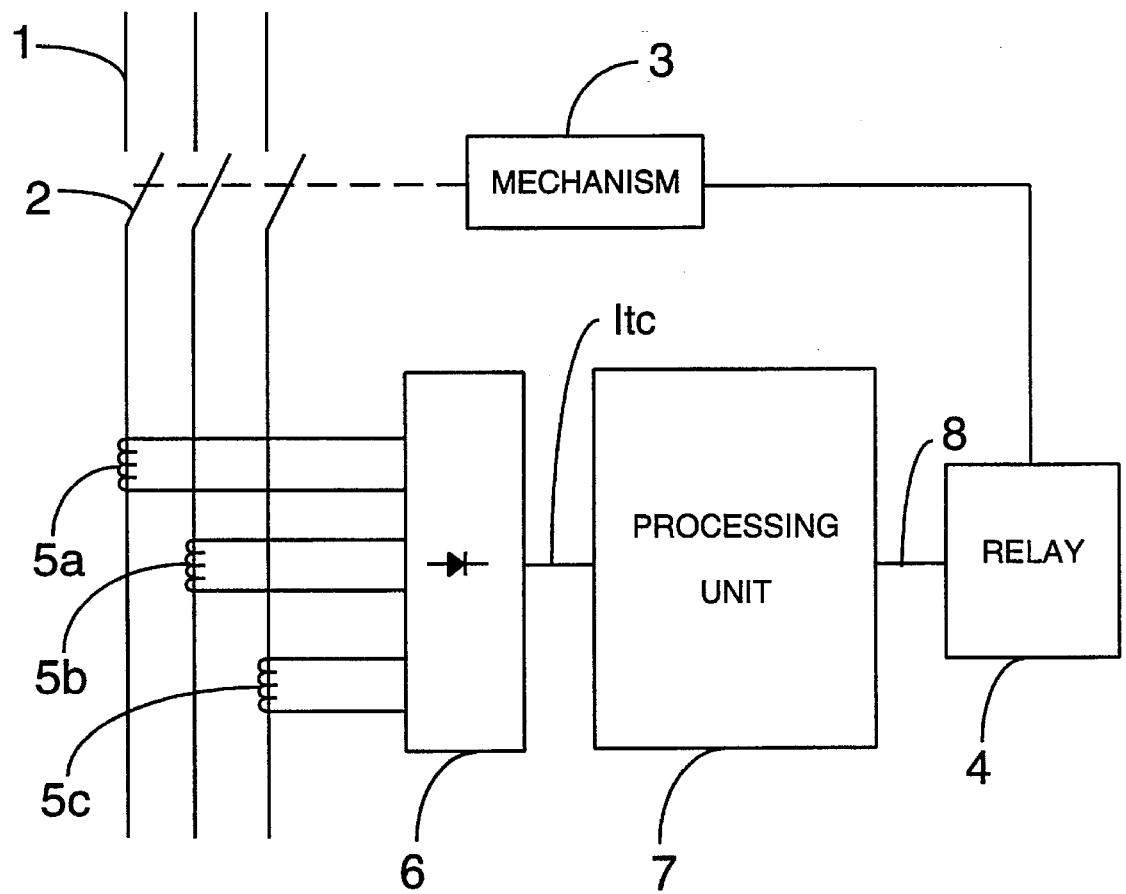
FIG. 1 represents a simplified block diagram of a circuit breaker in which a trip device comprising the invention can be implemented.

FIG. 1 represents the block diagram of a circuit breaker of known type. The electrical power system 1 to be protected is composed of electrical conductors. Contacts 2 enable the current to be established or interrupted in the power system 1. Current transformers 5a, 5b, 5c associated to the conductors of the power system 1 transform the primary currents of high intensity into secondary currents of low values compatible with electronic trip devices. These secondary currents are applied to the input of a shaping and measuring circuit 6. This circuit 6 supplies on output representative signals Itc applied to the input of an electronic processing unit 7. A tripping order 8 produced by the processing unit 7 is applied to the input of a control relay 4 which actuates an opening mechanism 3 of the circuit breaker contacts 2.

Figure 2:
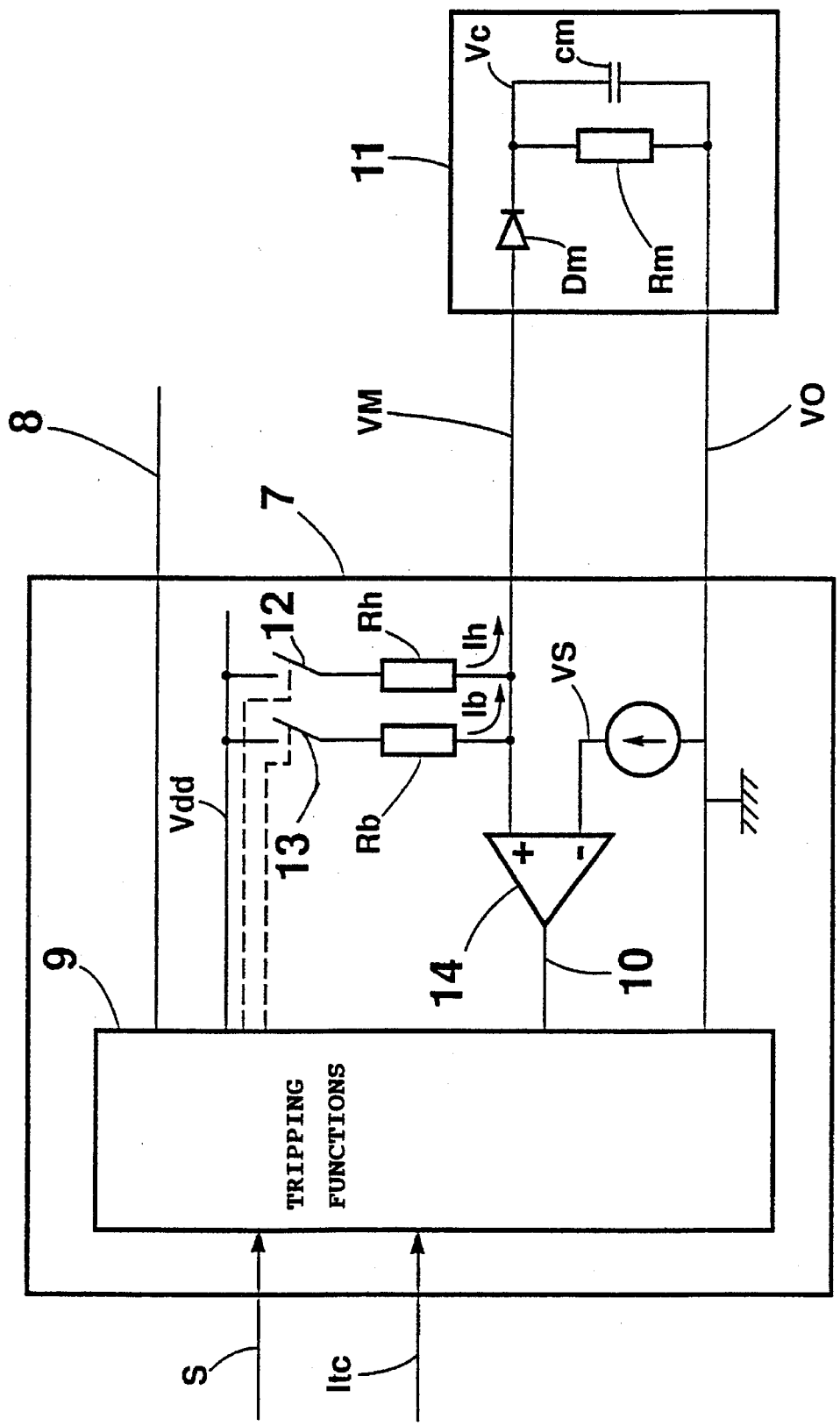
FIG. 2 represents the diagram of a storage device according to an embodiment of the invention.

In FIG. 2 a storage device, according to an embodiment of the invention, is associated to the processing unit 7. A circuit 9 comprising tripping functions is integrated in the processing unit 7. It receives the values Itc representative of the currents of the power system to be protected and parameters S corresponding notably to current thresholds and time delays. The circuit 9 supplies the tripping order 8. A signal 10, coming from the storage device and representative of the thermal state of the power system to be protected, is supplied to the circuit 9 for initialization of the tripping functions.

The storage device comprises a storage circuit 11 comprising a diode Dm, a storage capacitor Cm and a resistor Rm. The diode Dm is connected between a first input of the circuit 11 receiving a measuring signal VM and a first end of the capacitor Cm. The second end of the capacitor Cm is connected to a second input VO of the circuit 11 acting as reference electrical ground. The resistor Rm is connected in parallel with the capacitor. Charging of the capacitor is performed with a strong current Ih, before tripping of the circuit breaker. The current Ih is supplied by a power supply line Vdd via a switch 12, controlled by the circuit 9, and a resistor Rh. Evaluation of the capacitor charge is performed by measuring the voltage VM at the terminals of the capacitor Cm, Vm=VC+VD, VD being the DC voltage of Dm. As the diode Dm prevents current return, the charge is measured by input of a very weak current Ib during measurement of the voltage VM. The current Ib is supplied by the line Vdd via a switch 13, controlled by the circuit 9, and a resistor Rb. The device also comprises a comparator 14 enabling the value of the voltage VM to be compared to a reference threshold VS. The comparator output supplies the signal 10 indicating the thermal state of the power system to be protected.

Operation of the storage device is described hereafter. When a thermal fault is detected before tripping, the switch 12 is closed and the capacitor is charged quickly with a strong current Ih to about the voltage of Vdd. When the circuit breaker is opened, the trip device no longer operates, the diode Dm prevents the capacitor Cm from discharging into the trip device circuits, and the capacitor discharges only into the resistor Pun of high value. After reclosing of the circuit breaker, the trip device is initialized. A very weak current Ib is input, during a preset measuring period, to the circuit 11 so as to be able to measure the voltage VM representative of the capacitor charge. The signal VM is compared to the threshold VS. If VM is greater than VS the comparator transmits a signal representative of a hot state to the tripping functions, and in the opposite case it transmits a signal representative of a cold state. Discharging of the capacitor Cm into the resistor RM simulates cooling of the power system to be protected.

The printed circuits of the trip devices may present leakage resistances, notably when climatic stresses are present, which could accelerate discharging of the capacitor.

Figure 3:
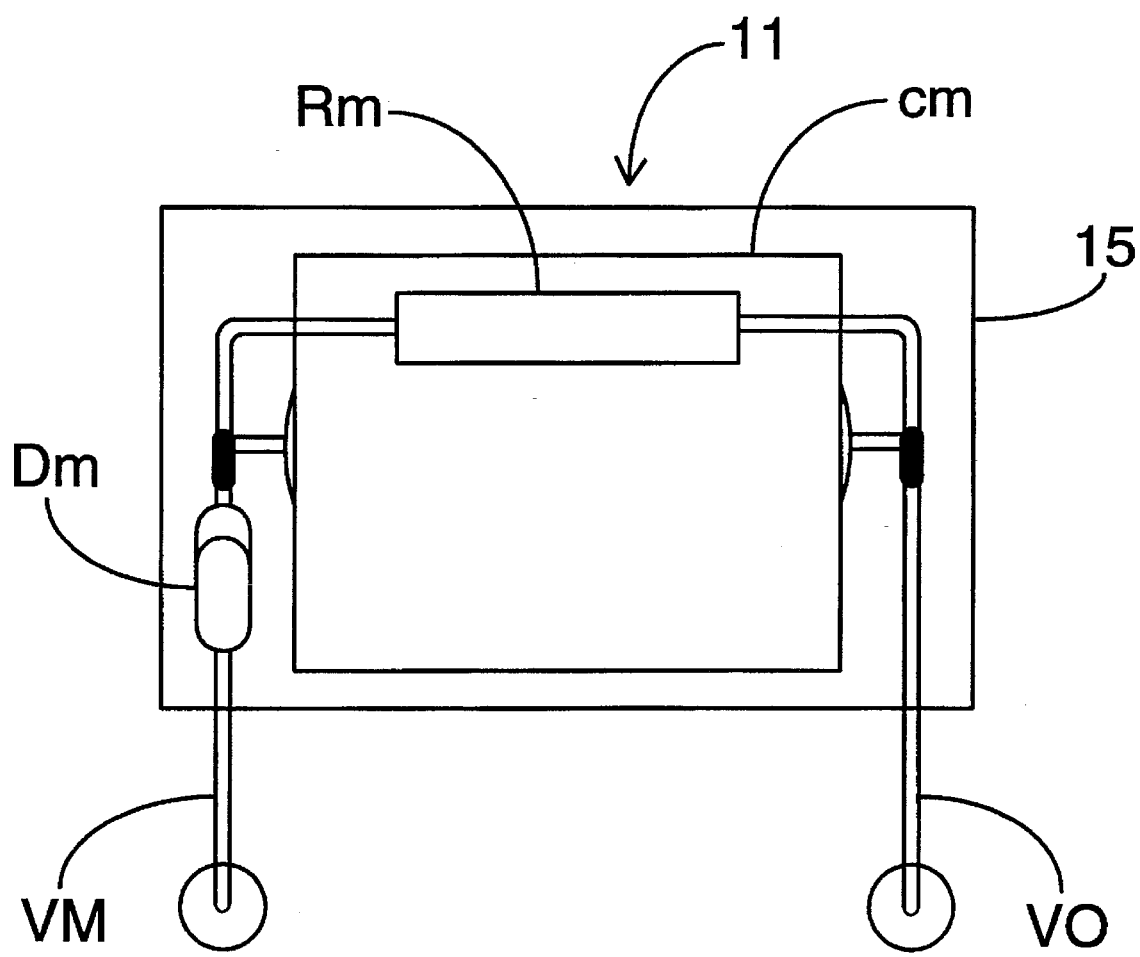
FIG. 3 shows an embodiment of a storage circuit able to be used in a device according to FIG. 2.

To overcome this drawback, in a preferred embodiment, the components of the circuit 11 are separated from the main circuit of the processing unit. They can advantageously be coated with an insulating material and be connected to the printed circuit via the two inputs VM and VO. An embodiment of a coated storage circuit is shown in FIG. 3. The components are soldered directly to one another. The coating of the circuit forms a casing able to be obtained by dipping or by moulding. In this embodiment, the circuit 11 forms a homogeneous component able to be fitted directly on the printed circuit of the processing unit. The coating of the circuit also enables the technology of the capacitor Cm to be changed. When it is fitted directly on the printed circuit, it must be of high value to compensate for the risks of quick discharge. Solid or gelled tantalum technology capacitors are the most widely used. With the coating it is possible to reduce the value of the capacitor and to use capacitors with a plastic film, for example polycarbonate or polyester. This change of technology increases the reliability of the storage circuit even further.

Figure 4:
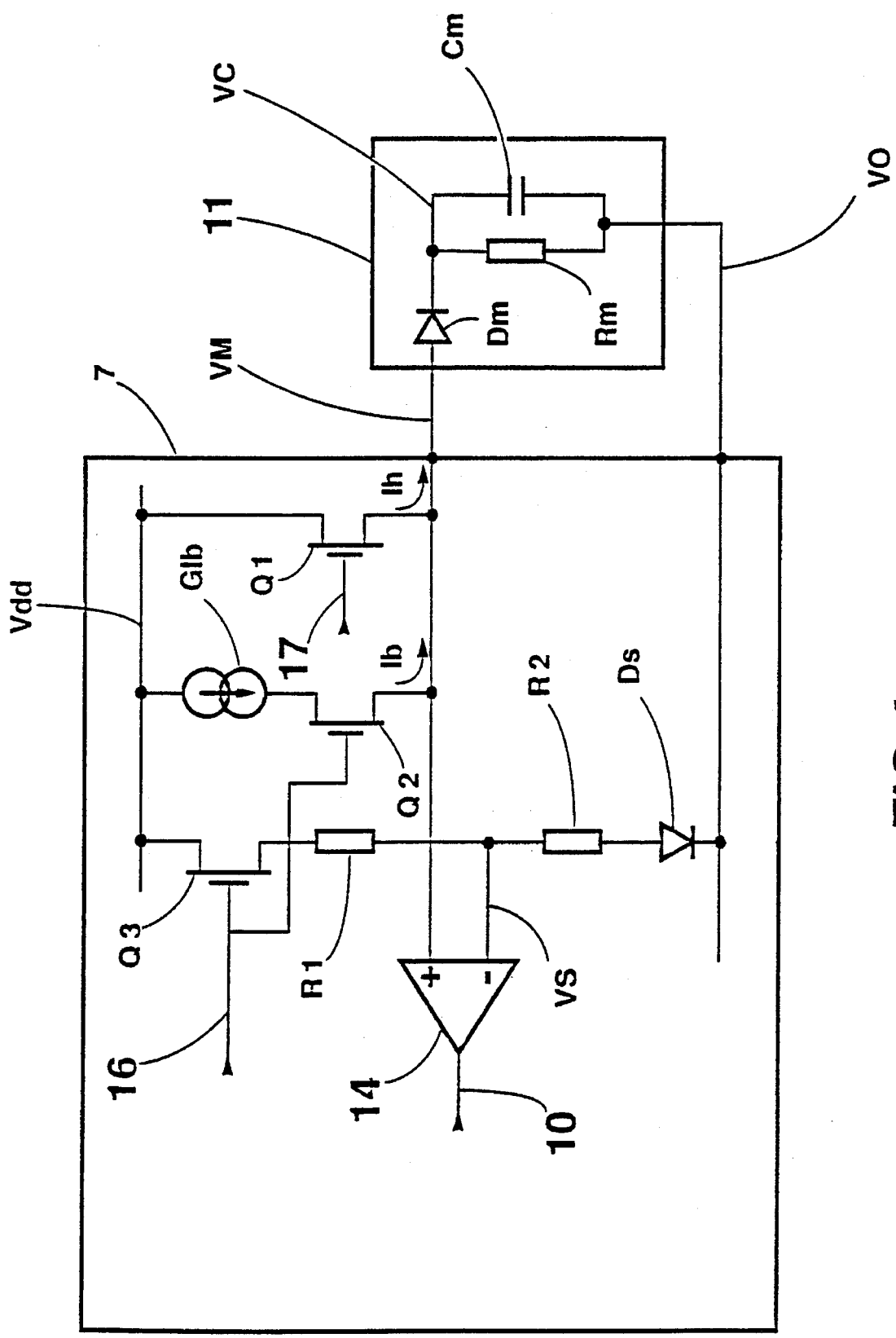
FIG. 4 represents the diagram of a development of the embodiment of FIG. 2.

FIG. 4 shows a development of the embodiment of FIG. 2. The switches 12 and 13 are formed by transistors respectively Q1 and Q2. The strong current Ih is limited by the characteristics in the ON state of the transistor Q1 during the transistor control by a line 17. The weak current Ib is limited by a current generator GIb connected between the power supply line Vdd and transistor Q2. The threshold voltage VS is achieved by means of a divider bridge comprising a transistor Q3, two resistors R1 and R2 and a diode DS. The transistor Q3 and resistor R1 are connected in series between the line Vdd and the input Vs of the comparator 14. The resistance R2 and diode Ds are connected in series between the input Vs and the reference ground VO. The transistors Q2 and Q3 are controlled at the same time by a common control line so as to generate the threshold voltage VS only during measuring of the voltage VM at the terminals of the storage circuit. The diode Ds serves the purpose of compensating the voltage drop in the diode Dm and the voltage fluctuations with the temperature.

Figure 5:
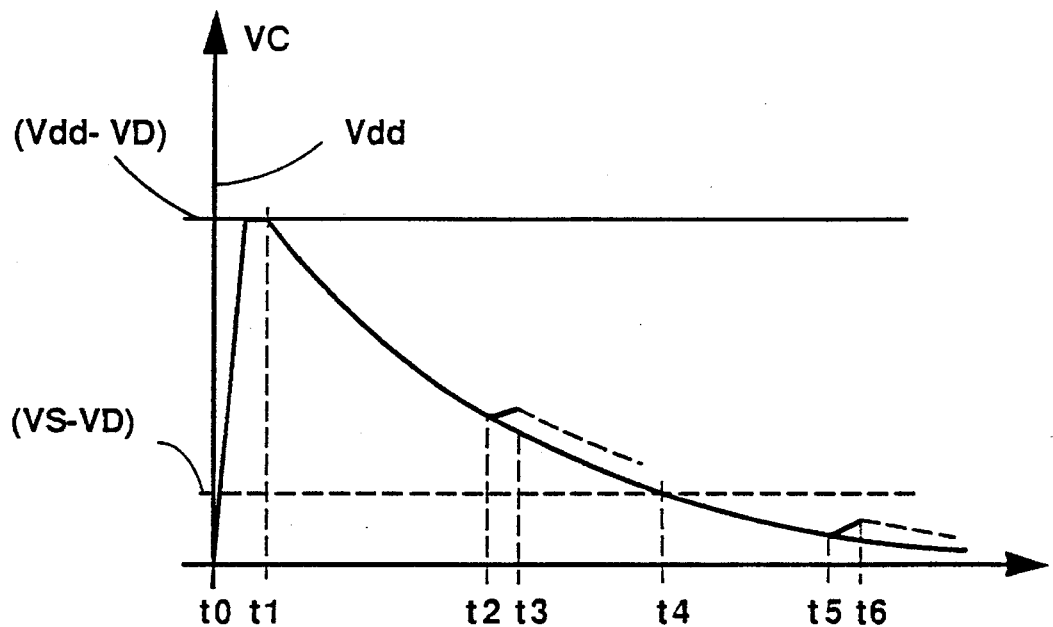
FIG. 5 illustrates the discharge curve of the capacitor of the storage circuit of FIG. 3.

The evolution of the capacitor charge is illustrated in FIG. 5. During input of the currents Ih and Ib, the voltage difference between the voltage VM at the terminals of the circuit 11 and the voltage VC at the terminals of the capacitor is equal to a DC voltage VD of the diode Dm. Between the times t0 and t1 the capacitor is charged by the strong current Ih at a voltage close to Vdd (Vdd−VD). At the time t1 the circuit breaker is opened and the capacitor Cm discharges with a time constant Rm Cm. If the circuit breaker is closed at the time t2, the charge of Cm is measured by injecting the very weak current Ib during a very short time and the voltage VM=VC+VD is greater than the voltage VS, i.e. VC>VS−VD. The comparator 14 transmits information representative of a hot thermal state. If the circuit breaker is not closed at the time t2, the capacitor continues to discharge and at the time t4 the capacitor charge becomes lower than the threshold, i.e. VC<VS −VD. By reclosing the circuit breaker at the time t5 after t4, the current measurement between the time t5 and t6 produces on output of the comparator 14 information representative of a cold thermal state.

Figure 6:
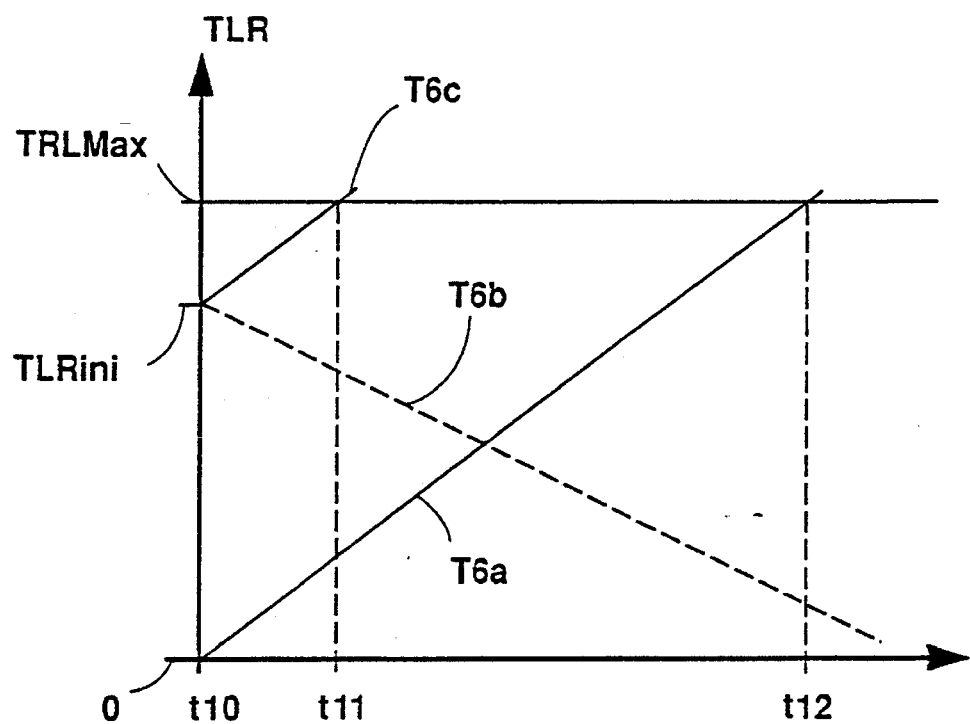
FIG. 6 illustrates the initialization and variations of the quantity representative of the thermal state.

FIG. 6 illustrates initialization of a quantity TLR representative of the thermal state. If, on initialization, the voltage VM is lower than VS or VC lower than VS−VD, as in the times after t4 in FIG. 5, the quantity TLR is initialized at a minimum value, for example zero. A thermal fault can make this quantity increase up to a maximum value TLR Max. to bring about tripping with a maximum time delay (curve T6a)

between the times t10 and t12. If on the contrary, on initialization, the voltage VM is greater than the threshold VS, a hot state is detected and the quantity TLR is initialized at an intermediate value TLRini situated between the minimum value 0 and the maximum value TLR Max. The quantity TLR can then decrease (curve T6b) if there is no thermal fault, or increase (curve T6c), in the presence of a thermal fault, up to the maximum value TLR Max. to bring about tripping. In the second operating case, the tripping delay is shorter, between the time t10 and a time t11.

Figure 7:
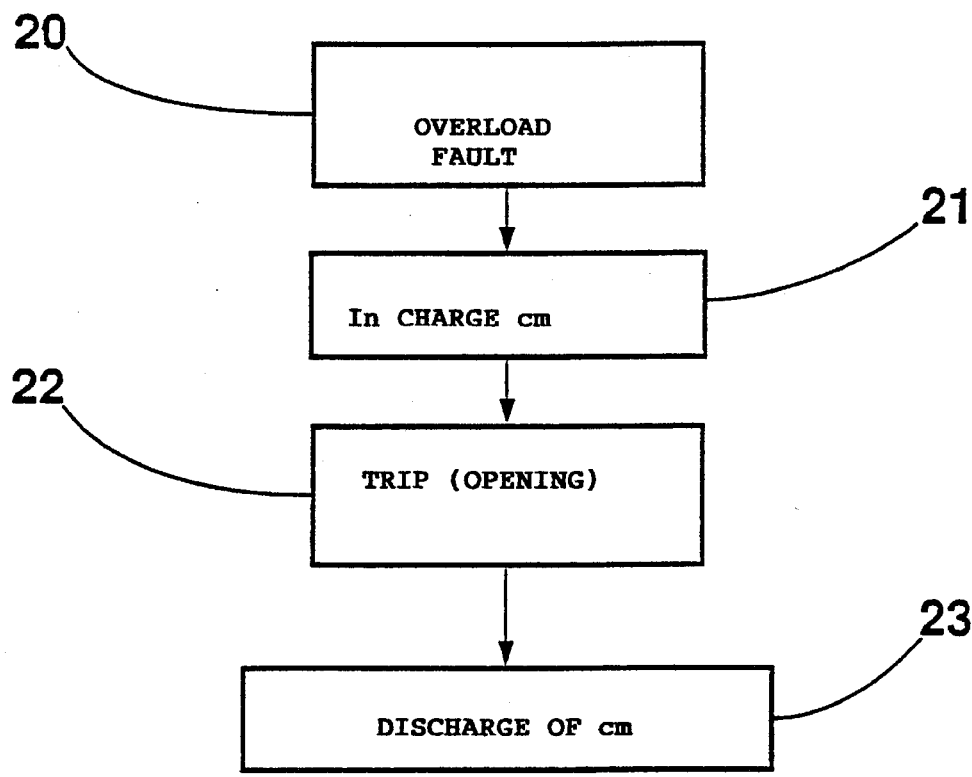
FIGS. 7 and 8 show flow charts of operation of a storage device according to FIGS. 2 and 4.
Figure 8:
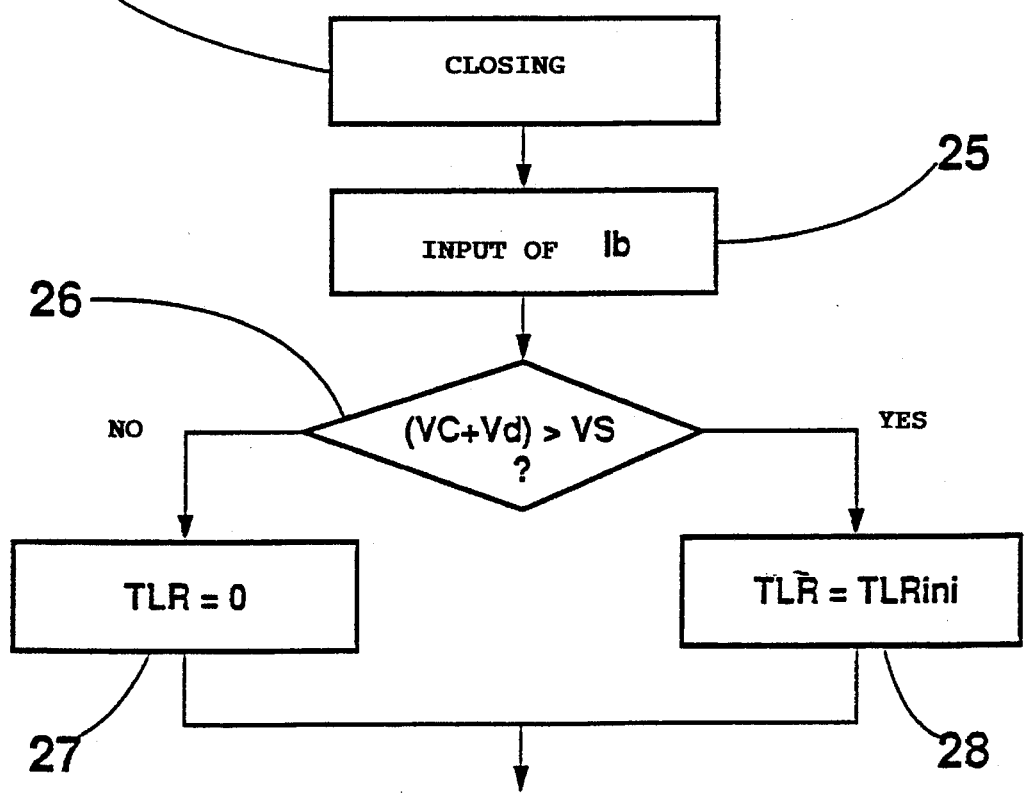

A flow chart of operation of the storage device according to FIGS. 3 and 4 is illustrated in FIGS. 7 and 8 corresponding respectively to opening and closing of the trip device. At the end of a stage 20, if an overload fault is detected, a tripping phase begins. The strong current Ih charges the capacitor Cm quickly during a stage 21. Then the trip device orders opening of the circuit breaker in a stage 22. After opening, during a stage 23 the capacitor discharges, simulating cooling. In FIG. 8, after closing of the circuit breaker (stage 24) the weak current Ib is input (stage 25) to determine the charge of the capacitor Cm, in a comparison (stage 26). If the voltage VM or VC+Vd is lower than the threshold VS the quantity TLR is initialized at the minimum value 0 (stage 27). If the result of the comparison is positive (VC+Vd>VS), a hot state is detected and the quantity TLR is initialized at an intermediate value TLRini in a stage 28.

The time delay Tm causing switching from a hot state to a cold state, corresponding to the time elapsed between the circuit breaker opening time t1 and a time t4 when the voltage VC becomes lower than the voltage VS−VD, is given by the expression:

$$Tm = Rm\, Cm\, \ln((Vdd-Vd1)/(VS-Vd2)) \quad (1)$$

where $\ln$ is the natural logarithm, Vd1 is the Dc voltage of the diode Dm through which the strong current Ih flows and Vd2 is the voltage of the diode Dm through which the weak current Ib flows.

For a voltage Vdd of 5 V, a voltage VS of 1 V, diode voltages Vd1 and Vd2 respectively equal to 0.6 V and 0.4 V, a tantalum capacitor Cm of 68μF and a resistance Rm of 4.7MΩ, the time delay Tm has an approximate value of 10 minutes. The tantalum capacitor can advantageously be replaced by a plastic film capacitor of 2.2 μF. The value of the resistance is then increased to 100 MΩ and the value of Tm would be about 8 minutes.

The current Ib is about 1 μA to 100 μA for about 200 μs whereas the current Ih is preferably greater than 1 mA.

Figure 9:
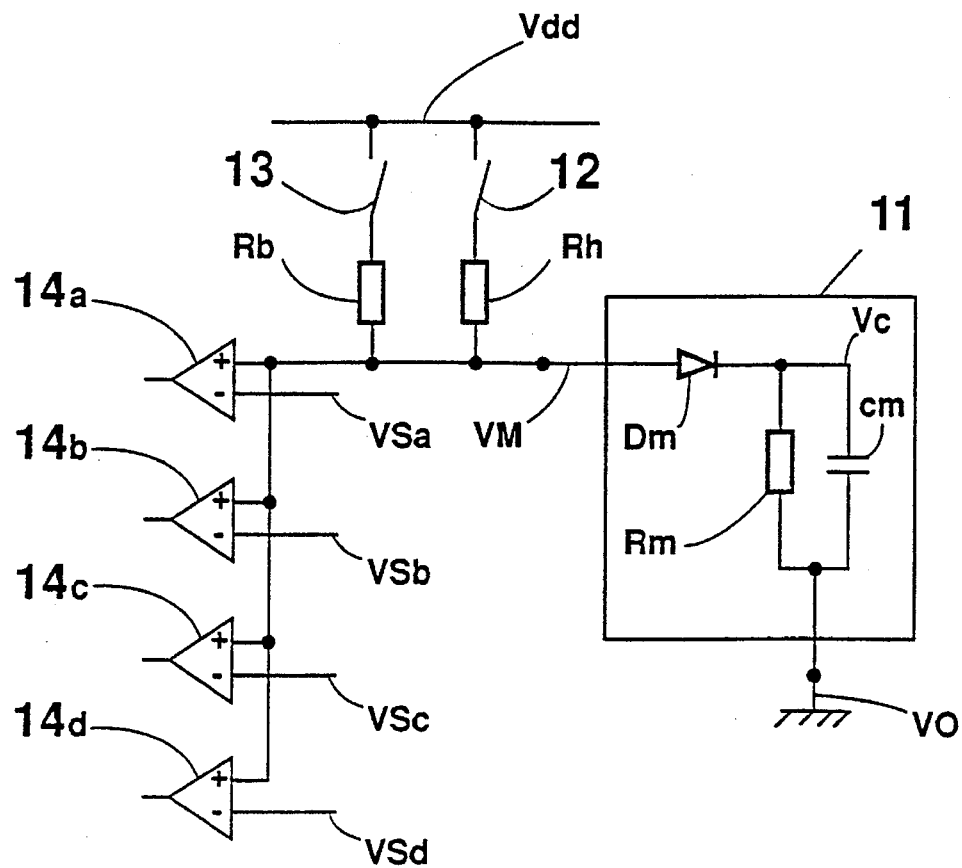
FIG. 9 shows a development of a device according to the invention comprising a plurality of comparators.

Another embodiment is represented in FIG. 9. It enables a more precise initialization of the quantity TLR representative of the thermal state of the power system to be protected. The comparator 14 is replaced by four comparators 14a, 14b, 14c and 14d which compare the voltage VM to four thresholds respectively Vsa, Vsb, Vsc and Vsd. If the values of the thresholds are arranged in increasing manner, Vsa>Vsb>Vsc>Vsd, the quantity TLR can take a value from among five on initialization. A first value can be 0 if VM<Vsd. A second value is TLRini if Vsd≦VM<Vsc. A third value is TLRini2 if Vsc≦VM<Vsb. A fourth value is TLRini3 if Vsb≦VM<Vsa, and a fifth value is TLRini4 if VM≧Vsa.

Figure 10:
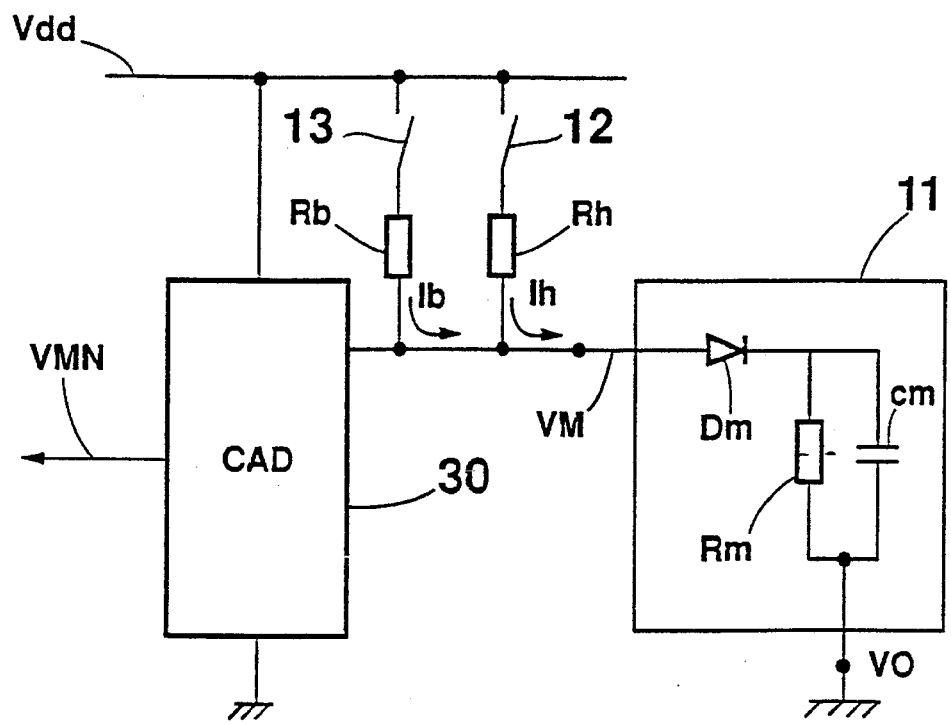
FIG. 10 shows another development of a device according to the invention comprising an analog-to-digital converter.

FIG. 10 shows a different embodiment. The comparators 14 or 14a–14b are replaced by an analog-to-digital converter 30 which supplies a digital value VMN of the voltage during measuring of the charge of VC when the weak current Ib is input. The value VMN is supplied to the tripping functions 9 of the processing unit for computation of the initialization value of the quantity TLR. In a preferred computation mode, the initial value of TLR can be proportional to the digital value VMN.

In the embodiments described above, the devices are integrated into a trip device able to be fitted in a circuit breaker, but they could also form part of other electrical protection devices. For example electrical motor control and protection devices can contain a device according to the invention.

The storage circuit 11 comprising the diode Dm, capacitor Cm and resistor Rm can be organized in a different manner, without modifying the operation, for example the diode Dm could be placed in the connection connected to the ground VO, the cathode being connected to the capacitor.

We claim:

1. An electronic trip device comprising a processing unit producing a tripping signal when currants of a power system to be protected exceed preset thresholds or preset times, and a trip storage device connected to the processing unit, said storage device comprising:

a storage circuit for simulating a cooling of the power system comprising two terminals, a diode connected in series with a capacitor between said terminals and a resistor connected in parallel with said capacitor;

means for injecting a strong current, connected to the storage circuit, to quickly charge the capacitor to a voltage representative of a thermal state of the power system via the diode before tripping;

means for injecting a weak current, connected to the storage circuit, when the trip device is put into operation; and means or measuring the voltage at the terminals of the storage circuit when sad weak current is injected into the capacitor via the diode, said voltage being representative of a thermal state of the power system.

2. The trip device according to claim 1, wherein the storage device comprises comparison means between a preset voltage threshold and the voltage at the terminals of the storage circuit.

3. The trip device according to claim 2, wherein the preset voltage threshold is generated at the same time as input of the weak current.

4. The trip device according to claim 2, wherein the processing unit comprises means for initializing a quantity, representative of the thermal state of the power system to be protected, at a minimum value if when the trip device is put into operation the voltage at the terminals of the storage circuit is lower than the preset threshold, and at an intermediate value, greater than the minimum value, if the voltage at the terminals of the storage circuit is greater than the preset threshold.

5. The trip device according to claim 1, wherein the storage circuit is coated in an insulating material.

* * * * *